3,393,184
TRIS(1-AZIRIDINYL)BORANES
Joseph Adrian Hoffman, Bridgewater Township, Somerset County, N.J., assignor to American Cyanamid Company, Stamford, Conn., a corporation of Maine
No Drawing. Filed Dec. 4, 1964, Ser. No. 416,134
6 Claims. (Cl. 260—82.1)

This invention relates to a new class of compounds. More particularly, it relates to tris(1-aziridinyl)boranes of the following formula:

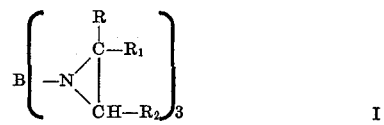

I wherein each of the R, $R_1$ and $R_2$ symbols is either hydrogen or lower alkyl. It also relates to the use of the boranes as cross-linking agents, particularly for elastomers.

The compounds of this invention can be prepared by reacting one mole of a boron trihalide (II) with three moles of an aziridinyllithium compound (III).

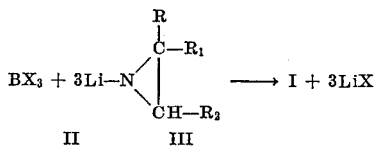

wherein X is halogen (particularly chlorine and bromine) and R, $R_1$ and $R_2$ are defined as above.

The boron trihalides (II) which may be used include boron trichloride, boron tribromide and boron triiodide.

The aziridinyllithium compounds are known and can be prepared by the reaction of an alkyl lithium with an alkyleneimine [J. Am. Chem. Soc., 67, 2106 (1945)] or by the reaction of lithium metal with an alkyleneimine (German Patent 1,040,037). The alkyleneimines include ethyleneimine (or the alternate name, aziridine), 1,2-propyleneimine (2-methylaziridine), 1,2-butyleneimine (2-ethylaziridine), 2,3 - butyleneimine (2,3 - dimethylaziridine), 2-methyl-1,2 - propyleneimine (2,2-dimethylaziridine), etc.

The reaction between the boron trihalide and the aziridinyllithium compound is carried out in a suitable inert solvent. Hexane is most convenient since butyllithium is commercially available in the form of a hexane solution. The reaction temperature is between —50° and +50° C.

It is recommended that the boron trihalide be added to a solution of the aziridinyllithium compound in the selected solvent. It is advantageous to prepare the aziridinyllithium compound in situ by one of the above methods using the solvent selected for the main reaction.

The tris(1-aziridinyl)boranes may be isolated from the reaction product by distillation.

The tris(1-aziridinyl)boranes of Formula I are colorless, high boiling, mobile liquids. They react violently with water.

The products of this invention contain three aziridinyl groups and are reactive with monomeric and polymeric compounds having reactive hydrogens, including alcohols, phenols, mercaptans, thiophenols, carboxylic acids, amines, etc. They are thus useful as cross-linking agents in the preparation of plastics and resins, textiles, varnishes, paper, etc. For example, they are effective curing agents or chain-extending agents for vulcanizable rubbery materials which serve as binders in solid rocket propellant compositions. Rubbery materials include homopolymers of conjugated dienes and copolymers of conjugated dienes with materials copolymerizable therewith (as shown in U.S. Patent No. 3,087,843). Of particular interest is their use in propellant compositions comprising an inorganic oxidizing salt and either a synthetic acid-terminated polymeric binder or a synthetic copolymer of a conjugated diene and an unsaturated carboxylic acid (see U.S. Patent No. 3,087,844). The first type of polymer may be exemplified by the formula:

HOOC—Q—COOH wherein Q is a polymer chain, as, for example, a polymer of a conjugated diene such as 1,3-butadiene. The second type of polymer may be exemplified by a copolymer of 1,3-butadiene and acrylic acid. Utility in this capacity is surprising, since many known polyalkyleneimine compounds are unstable and undergo polymerization on standing, whereas the present compounds are stable at room temperature for extended periods of time.

The following examples, in which parts and percentages are by weight, are presented to further illustrate the present invention.

EXAMPLE 1

Tris(2-methyl-1-aziridinyl)borane $$B\left(-N\diagdown\begin{array}{c}CH-CH_3\\ \diagup\\ CH_2\end{array}\right)_3$$

Boron trichloride (3.9 g., 0.033 mole) is added dropwise to a solution of 2-methyl-1-aziridinyllithium in hexane, prepared by reacting 43.0 ml. of 15% solution of butyllithium (6.4 g., 0.1 mole) in hexane with 1,2-propyleneimine (5.7 g., 0.1 mole). During the addition, the temperature is maintained at about 0–5° C. The mixture is allowed to approach room temperature and stirred for two hours. The mixture is filtered and the hexane is removed by distillation. The pale yellow residual oil is distilled (B.P. 55° C./2 mm.) to give 2.5 g. of water white liquid.

EXAMPLE 2

Tris(1-aziridinyl)borane $$B\left(-N\diagdown\begin{array}{c}CH_2\\ \diagup\\ CH_2\end{array}\right)_3$$

The procedure of Example 1 is followed substituting a solution of 1-aziridinyllithium, prepared from ethyleneimine, for the 2-methyl-1-aziridinyllithium.

EXAMPLE 3

Tris(2,3-dimethyl-1-aziridinyl)borane $$B\left(-N\diagdown\begin{array}{c}CH-CH_3\\ \diagup\\ CH-CH_3\end{array}\right)_3$$

The procedure of Example 1 is followed substituting a solution of 2,3-dimethyl-1-aziridinyllithium prepared from 2,3-butyleneimine, for the 2-methyl-1-aziridinyllithium.

EXAMPLE 4

Tris(2-ethyl-1-aziridinyl)borane $$B\left(-N\diagdown\begin{array}{c}CH-C_2H_5\\ \diagup\\ CH_2\end{array}\right)_3$$

The procedure of Example 1 is followed substituting a solution of 2-ethyl-1-aziridinyllithium prepared from 1,2-butyleneimine, for the 2-ethyl-1-aziridinyllithium.

EXAMPLE 5

Tris(2,2-dimethyl-1-aziridinyl)borane

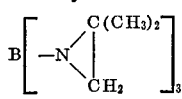

The procedure of Example 1 is followed substituting 2,2-dimethyl-1-aziridinyllithium, prepared from 2-methyl-1,2-propyleneimine for the 2-methyl-1-aziridinyllithium.

EXAMPLE 6

The product of Example 1 (0.6 g.) is added to a carboxy-terminated polybutadiene (molecular weight about 3800) (20.0 g.) at room temperature. In a few minutes an elastomeric polymer is obtained. This indicates that the borane acted as a cross-linking agent.

EXAMPLE 7

An equivalent amount of the carboxy-terminated copolymer of 1,3-butadiene and acrylic acid is substituted in the procedure of Example 6. An elastomeric polymer is obtained.

I claim:

1. A compound of the formula:

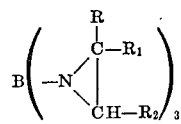

wherein each of R, $R_1$ and $R_2$ is selected from the group consisting of lower alkyl.

2. Tris(2-methyl-1-aziridinyl)borane.

3. The process of preparing a compound of claim 1 which comprises reacting about one mole of a boron trihalide with three moles of a compound of the formula:

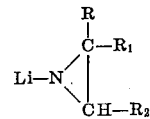

wherein X is halogen and each of R, $R_1$ and $R_2$ is selected from the group consisting of hydrogen and lower alkyl, said reacting being conducted in an inert organic solvent at a temperature between —50° C. and 50° C.

4. The method of curing a carboxy-terminated rubbery polymer characterized by the use of a compound of claim 1 as the curing agent.

5. The method of claim 4 wherein the carboxy-terminated rubbery polymer is a carboxy-terminated polymer of 1,3-butadiene.

6. The method of claim 4 wherein the carboxy-terminated rubbery polymer is the copolymer of 1,3-butadiene and acrylic acid.

References Cited

UNITED STATES PATENTS 3,214,421   10/1965   Mahan  ------------ 260—82.1
3,223,681   12/1965   Rambosek  ---------- 260—239

JOSEPH L. SCHOFER, *Primary Examiner.*

DANIEL K. DENENBERG, *Assistant Examiner.*